(12) United States Patent
Beckmann et al.

(10) Patent No.: US 7,415,046 B2
(45) Date of Patent: Aug. 19, 2008

(54) METHOD, APPARATUS AND COMPUTER PROGRAMS FOR MULTIPLEXING AND/OR DEMULTIPLEXING

(75) Inventors: Mark Beckmann, Braunschweig (DE); Udo Hallmann, Lahstedt (DE); Andreas Otte, Celle (DE); Michael Eckert, Braunschweig (DE); Martin Hans, Hildesheim (DE)

(73) Assignee: Siemens Aktiengesellschaft, Munich (DE)

( * ) Notice: Subject to any disclaimer, the term of this patent is extended or adjusted under 35 U.S.C. 154(b) by 825 days.

(21) Appl. No.: 10/078,584

(22) Filed: Feb. 19, 2002

(65) Prior Publication Data

US 2003/0007517 A1 Jan. 9, 2003

(30) Foreign Application Priority Data

Feb. 19, 2001 (DE) .................................. 101 07 700

(51) Int. Cl.
*H04J 3/02* (2006.01)
*H04B 7/00* (2006.01)

(52) U.S. Cl. .................. 370/537; 370/282; 370/320; 370/329; 370/336; 370/466; 455/437; 455/450; 455/453; 455/509; 455/552.1

(58) Field of Classification Search ......... 370/329–335, 370/338, 341, 431, 535, 536, 351–356, 389, 370/349, 328, 282, 320, 466, 537; 455/422.1, 455/436, 437, 450, 453, 509, 552.1
See application file for complete search history.

(56) References Cited

U.S. PATENT DOCUMENTS

| 6,363,058 | B1 * | 3/2002 | Roobol et al. | 370/310 |
|---|---|---|---|---|
| 6,374,112 | B1 * | 4/2002 | Widegren et al. | 455/452.2 |
| 6,473,399 | B1 * | 10/2002 | Johansson et al. | 370/229 |
| 6,473,442 | B1 * | 10/2002 | Lundsjo et al. | 370/537 |
| 6,594,241 | B1 * | 7/2003 | Malmlof | 370/329 |
| 6,788,652 | B1 * | 9/2004 | Hwang | 370/282 |
| 2002/0091860 | A1 * | 7/2002 | Kalliokulju et al. | 709/247 |
| 2002/0154612 | A1 * | 10/2002 | Massie et al. | 370/329 |

OTHER PUBLICATIONS

Mobilfunknetze und ihre Protokolle—Band 1—B. Walke, Teubner, 2000, pp. 394-396.
Network Working Group Request for Comments—K.R. Sollins, Jun. 1981, The TFTP Protocol (Revision 2) pp. 1-18.
3GPP TS 25.322 V3.4.0 (Sep. 2000) 3rd Generation Partnership Project: Technical Specification Group Radio Access Network; RLC protocol specification (Release 1999).

(Continued)

*Primary Examiner*—Edan Orgad
*Assistant Examiner*—Venkatesh Haliyur (57) ABSTRACT

A method, apparatus and computer program for multiplexing a number of second channels, in particular logical channels, in accordance with the UMTS protocol architecture for the air interface, onto a first channel, in particular a transport channel, in accordance with the UMTS protocol architecture for the air interface, in a transmission apparatus and/or for demultiplexing in the opposite direction in a receiving apparatus, with the channels that are involved being configured by means of at least one configuration command, in particular with regard to the size of the data units to be transported by them. In the configuration, at least one size of data units is in each case supported by only a single second channel, in order to allow data units of this size to be allocated to the relevant second channel.

8 Claims, 5 Drawing Sheets

OTHER PUBLICATIONS

3GPP TS 25.321 V3.5.0 (Sep. 2000) 3rd Generation Partnership Project: Technical Specification Group Radio Access Network MAC protocol specification (Release 1999).

Internet Protocol DARPA Internet Program Protocol Specification Sep. 1981—pp. 1-45 prepared by Information Sciences Institute.

3GPP TS 25.302 V3.6.0 (Sep. 2000) 3rd Generation Partnership Project: Technical Specification Group Radio Access Network; Services provided by the physical layer (Release 1999).

3GPP TS 25.331 V3.4.1 (Sep. 2000) 3rd Generation Partnership Project: Technical Specification Group Radio Access Network; RRC Protocol Specification (Release 1999).

* cited by examiner

METHOD, APPARATUS AND COMPUTER PROGRAMS FOR MULTIPLEXING AND/OR DEMULTIPLEXING

BACKGROUND OF THE INVENTION

The present invention relates to a method for multiplexing a number of second channels, in particular logical channels, in accordance with the UMTS protocol architecture for the air interface, onto a first channel, in particular a transport channel, in accordance with the UMTS protocol architecture for the air interface, in a transmission apparatus and/or for demultiplexing in the opposite direction in a receiving apparatus, with the channels that are involved being configured via at least one configuration command, in particular with regard to the size of the data units to be transported by them.

Furthermore, the present invention relates to a transmission and/or receiving apparatus, which supports the transmission and/or reception of messages on the basis of a protocol architecture, in particular the UMTS protocol architecture for the air interface.

In addition, the present invention relates to corresponding computer programs and to a corresponding computer program product.

Figure 1:
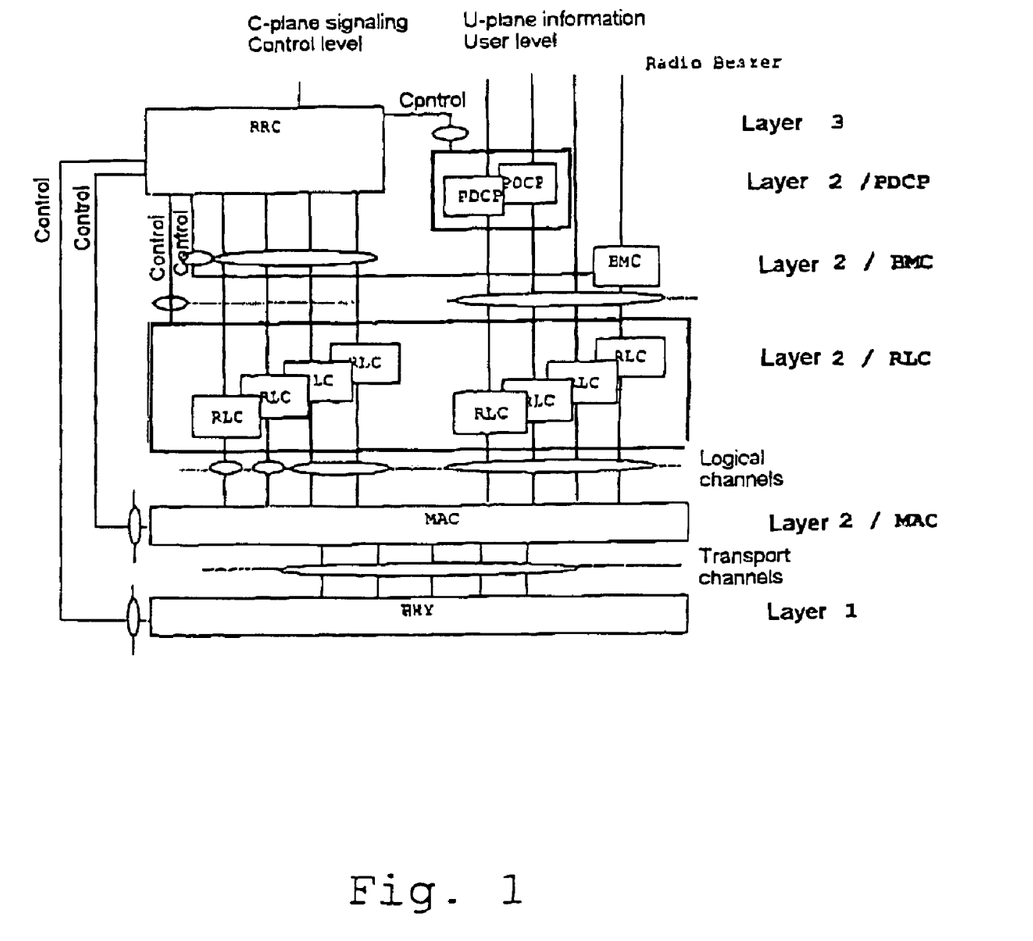
FIG. 1 shows the known UMTS layer 2 and layer 3 protocol architecture.

The third mobile radio generation UMTS (Universal Mobile Telecommunication System) has a protocol layer structure on the UMTS air interface; in this context, see, for example, "Mobilfunknetze und ihre Protokolle" [Mobile Radio Networks and their Protocols], B. Walke, Teubner, 2000, pages 385 et seq., whose disclosure is hereby included. FIG. 1 shows the known UMTS protocol architecture for layer 2 and for the lower layer 3, which include the protocols for the UMTS air interface; in this context, see the above reference, page 395. This architecture is located in such a way in the mobile terminal (User Equipment, UE) and in a node in the mobile communications network (Radio Network Controller, RNC), that is to say each of the protocols exists firstly in the UE and secondly in the RNC.

Identical protocols interchange protocol data units (PDUs) by using the services in the protocol layers located below them to transport the PDUs. Each protocol layer offers its services to the layer located above it at so-called service access points. These service access points are provided with generally used and unique names in order to assist understanding of the architecture (for example, logical channels, transport channels, Radio Bearer). For data transfer, protocols receive service data units (SDUs) at their service access points and emit PDUs produced from them to the layer located below them, with PDUs from upper layers thus being identical to the SDUs in the layer beneath them.

The protocol layers illustrated in FIG. 1 are the:
Radio Resource Control (RRC) layer (lower layer 3)
Packet Data Convergence Protocol (PDCP) layer (upper layer 2)
Broadcast/Multicast Control (BMC) layer (upper layer 2)
Radio Link Control (RLC) layer (central layer 2)
Medium Access Control (MAC) layer (lower layer 2)
physical layer (PHY) (layer 1).

Since the PDCP and BMC layers do not have any particular significance in the context of the present invention, they will not be described any further here. The functions of the RRC, RLC and MAC will be explained in general form, briefly, in the following text.

Data from various applications can be produced in the UMTS mobile radio terminal (UE). For example, for voice connections, a voice coder produces one or more voice data streams, or an HTML browser produces irregular packet data streams. First of all, this data may be modified by protocols from higher layers, and may be prepared for data transfer in different networks (for example, TCP, see RFC 0783, Transmission Control Protocol (TCP), IETF, September 1981 and IP, see RFC 0791, Internet Protocol (IP), IETF, September 1981). For transportation via the UMTS air interface, this data must be optimized in the various protocols at layer 2 (PDCP, RLC and MAC). The protocol architecture illustrated in FIG. 1 is, in this case, split not only horizontally into the already mentioned layers and units, but also vertically into the control plane (C plane) and the user plane (U plane). Only control data, which is required for setting up and maintaining a connection and is produced in the RNC or UE itself, is transmitted via the C plane while, in contrast, the actual user data from higher layers is transported via the U plane. In the area of the U plane, the service access point, at which non-UMTS-specific protocols can use the transmission service of the UMTS air interface, is referred to as a Radio Bearer (RB). RBs are thus offered above layer 2, depending on which protocols are used above PDCP, BMC or RLC, and transmit data in transparent form from the UE via the UMTS air interface to the RNC, and vice versa. When setting up such an RB for this transmission, a specific transmission quality of service (QoS) is defined, which is distinguished, for example, by a specific guaranteed data rate or a maximum transmission delay.

RBs may be bidirectional or unidirectional. An RB can thus transmit data either in two directions (in the Uplink, UL and in the Downlink, DL) or in only one direction (UL or DL).

In the area of the C plane, that service access point at which the RRC protocol in the lower layer 3 can use the transmission service of the UMTS air interface is referred to as the Signaling Radio Bearer (SRB). SRBs likewise may be bidirectional or unidirectional and may transport messages from higher instances in layer 3 from the transmitter to the receiver, and/or vice versa. Furthermore, the RRC units negotiate the transmission parameters for a connection from the transmitter and receiver via the SRBs, on the basis of which the units in layer 2 and layer 1 are configured or reconfigured.

Since the data streams of an RB are present either continuously or in packets of any desired length, the object of the RLC protocol is to divide the data stream into packets (or to join packets together) which have an optimum length for the air interface. RLC-SDUs are thus broken down into RLC-PDUs, or a number of RLC-SDUs are joined together to form RLC-PDUs. Furthermore, the RLC layer stores the data which is present at an RB in an RLC buffer, until it can be transported via the air interface by the layers located under the RLC. The RLC layer has further objects (in particular, those of error correction and encryption), but these are not relevant here, see TS 25.302, Services Provided by Physical Layer, 3GPP, September 2000, pages 16-20. The RLC layer passes on the RLC-PDUs produced after the division process (or combination process) to the MAC layer for further transmission. The RLC layer is, in this case, modeled such that there is one autonomous RLC entity per Radio Bearer, see TS 25.322, Radio Link Control, 3GPP, September 2000.

The service access points at which the MAC layer offers its services are referred to as logical channels. If the RB associated with an RLC unit is unidirectional, this unit sets up only one logical channel for the duration of the connection, provided user data and RLC control data, which are required for error correction and for decryption in the receiver, are transported via the same logical channel. If user data and RLC control data are transmitted via different channels, the RLC unit is configured with two logical channels. If, on the other hand, the RB is bidirectional, one or two logical channels are accordingly set up for each direction (UL/DL) for the associated RLC unit. Logical channels differ by the nature of the data which is transmitted on them. A distinction is therefore drawn between logical channels on which UE-specific user data (Dedicated Traffic Channel, DTCH), UE-specific control data (Dedicated Control Channel, DCCH) or general control data (Common Control Channel, CCCH) is transmitted. Furthermore, a number of DTCHs may differ in terms of the QoS configured for the corresponding RB.

For transmission of the data via the air interface, the primary relevant factor is not what is transmitted, but how the data is transmitted. The physical layer, which includes the coding of the data, the modulation, the radio-frequency technology and the antenna, therefore provides service access points for the MAC layer which are distinguished in how the data is transmitted: the so-called transport channels. There is no longer any distinction between user data and control data on the transport channels and a distinction is drawn, for example, between UE-specific channels (Dedicated Channel, DCH), random access channels (RACH), or channels which are used jointly by a number of UEs (Uplink or Downlink Shared Channel, USCH or DSCH).

The object of the MAC layer in the transmitter is to map the data which is present on a logical channel above the MAC layer onto the transport channels in the physical layer, and to distribute data received on transport channels in the receiver between logical channels. Each transport channel is, for this purpose, initially configured with a set of fixed parameters for data transmission. The MAC layer can search from a further set of variable parameters for the best parameters in each case for the current transmission, and can thus influence the data transmission dynamically. A valid setting of all the parameters for a transport channel is, in this case, referred to as a Transport Format (TF). The set of all the possible settings for a transport channel is called a Transport Format Set (TFS). The individual TFs in a TFS are identified by an indicator. This indicator is referred to as a transport format indicator (TFI). Only the variable (dynamic) parameters in the TF vary within a TFS. Only one transport format is set for each transport channel at a given time. The set of transport formats set for all the transport channels which are present at a specific time is called the Transport Format Combination (TFC). The transport formats which are valid for each transport channel result in a very large number of possible combinations for all the transport channels and, in theory, each of these combinations can result in a TFC. In practice, the number of combinations of transport formats which are actually permissible at the same time is, however, restricted. The set of all the permissible TFCs is referred to as the Transport Format Combination Set (TFCS), see TS 25.302, Services Provided by Physical Layer, 3GPP, September 2000, pages 16-20.

The RRC protocol is responsible for setting up, clearing and reconfiguration of transport channels, logical channels and RBs and for negotiating all the parameters for the layer 2 protocols, see TS 25.331, Radio Resource Control, 3GPP, September 2000. This protocol is likewise present in the UE and in the RNC, and uses the transmission services which the RLC layer provides, that is to say the SRBs, to send RRC messages. The various protocols for layer 2 are then configured using the transmission parameters negotiated between the RRC protocols. For example, a TFS is negotiated between the RRC protocols for each transport channel on setting up or during reconfiguration, and the TFCS which is applicable to all the transport channels is transmitted. Both are then configured into the MAC layer, so that the MAC layer can map the logical channels onto the transport channels.

As described above, a transport format includes static parameters which cannot be influenced by the MAC layer but are negotiated only by the RRC, and dynamic parameters, one set of which is negotiated by different settings of the RRC, and which can be influenced by the MAC layer. The static parameters include:

The length of the transmission interval (Transmission Time Interval, TTI); that is to say, the time interval for which the physical layer processes data cohesively. This may have a length of 10, 20, 40 or 80 milliseconds.

The coding scheme for error protection.

The length of the redundant information for error protection (CRC).

The dynamic parameters are:

RLC Size. Since the MAC layer neither generates MAC-PDUs nor segments or attaches to one another the RLC-PDUs received by the RLC, an MAC-PDU corresponds precisely to an RLC-PDU for as long as the MAC layer does not insert a control data header (MAC header) before the RLC-PDU. If the MAC layer places a control data header before the RLC-PDUs, then the MAC-PDU is greater than the length of an RLC-PDU by the length of the MAC header. This parameter is, thus, used to set both the size of the RLC-PDU and the size of the MAC-PDU. The data block which is transmitted on the transport channel to the physical layer, the MAC-PDU, is also referred to as a transport block.

Number of Transport Blocks. This parameter determines the number of MAC-PDUs which may be passed to the physical layer for simultaneous processing and transfer via the air interface during one TTI.

In some cases, the TTI also may be a dynamic parameter.

As can be seen, the parameters TTI, RLC Size and Number of Transport Blocks result in the instantaneous data rate of the transport channel, which can be set dynamically by the MAC layer by selecting the various transport formats; that is to say, by varying the TTI, the RLC Size and the Number of Transport Blocks.

In addition to the dynamic selection of a TFC for each transmission interval, the MAC layer has the task of distributing the data arriving on the various RBs between the transport channels, taking account of the QoS set for that RB. In this case, for example when setting up and reconfiguring RBs, the RRC layer negotiates which logical channels will be mapped onto which transport channels, in the process of which a number of logical channels can be allocated to each transport channel.

The transmitting MAC layer now searches for a transport format (that is to say, overall, a TFC) for each transmission interval and for each transport channel and determines the logical channels which will be used to transmit data in the TTI under consideration. The MAC layer then signals the RLC-PDU-Size associated with the respective TF (assuming this is not constant for the duration of the connection) to the appropriate RLC units, together with the number of expected RLC-PDUs. The RLC then segments the data from the RLC buffer on the basis of the RLC-PDU-Size and passes the corresponding number of RLC-PDUs on the corresponding logical channel to the MAC layer. If appropriate, this adds an MAC header to the data, and at the same time passes the entire MAC-PDUs for one transport channel to the physical layer, which then ensures that the data is transported via the UMTS air interface within a TTI.

In the following description of data transmission from a mobile station (UE) to a node in the mobile radio system, in particular a Radio Network Controller (RNC), or vice versa, a distinction is drawn (where necessary) between a transmission unit and a receiving unit, although both the RNC and the UE can carry out the function of either the transmitter or the receiver. Generally, there is always one configuring unit and one unit to be configured in order to set up or to reconfigure a connection. In the case of UMTS, the RNC is in principle the configuring unit and the UE is the configured unit. The receipt of configuration parameters via a configuration message from the RNC to the UE can, in general, be confirmed by transmitting a receipt acknowledgement from the UE to the RNC, in which case the configuration parameters which are sent from the UE to the RNC for confirmation may differ from those previously received.

In order to set up a connection, the layer 1 and the units in layer 2 (MAC, RLC, BMC and PDCP) in the transmitter and in the receiver must be configured by their RRC protocols, that is to say these units are told the parameters which will be used to set up the connection. This configuration also includes the information about the characteristics and the number of the individual service access points (for example RBs, SBRs, logical channels and transport channels) between the various layers and units in the layers.

For each RB, the RLC is told, for example, whether one or two logical channels will be set up per transmission direction (UL/DL), the logical channel via which user data will be transported, and via which RLC control data will be transported, what the maximum number of RLC-PDUs is which may be transmitted without any receipt acknowledgement, etc. During the configuration process, the priorities, for example, on the basis of which the logical channels are distributed between the transport channels, the identification number of each logical channel and of each transport channel, on the basis of which they can be identified uniquely, the type of each transport channel, the TFS of each transport channel, and the TFCS, etc., are transmitted to the MAC. Furthermore, the RRC allocates one or more logical channels to each possible RLC Size, in which case, during the connection, the logical channels support only those RLC Sizes to which they have been allocated. This allocation of logical channels to RLC Sizes is likewise signaled to the MAC during the configuration process.

Once the layer 1 and the units in layer 2 have been configured in accordance with the QoS required for the corresponding connection, each RLC unit in each RB starts to manipulate or to prepare those RLC-SDUs which have been supplied from the higher layers or from higher protocols in layer 2 (PDCP and BMC), for transmission via the air interface. To do this, the MAC first of all signals to each RLC unit the number of bits which the PDUs produced by the RLC should have (RLC Size). This is done taking account of the allocation of logical channels to RLC Sizes. The RLC unit then starts to break down or assemble the RLC-SDUs to form the required RLC-PDUs. Depending on the configuration of the corresponding RLC unit, the data in the RLC-PDU is also prefixed by a control data header. The RLC-PDUs produced in this way are then written to a transmission memory, which is organized as a stack memory. During further signaling, in which the MAC tells the RLC units how many RLC-PDUs are expected in the following TTI (Number of Transport Blocks), each RLC unit uses the logical channels to transfer a specific number of RLC-PDUs to the MAC for further processing.

Figure 2:
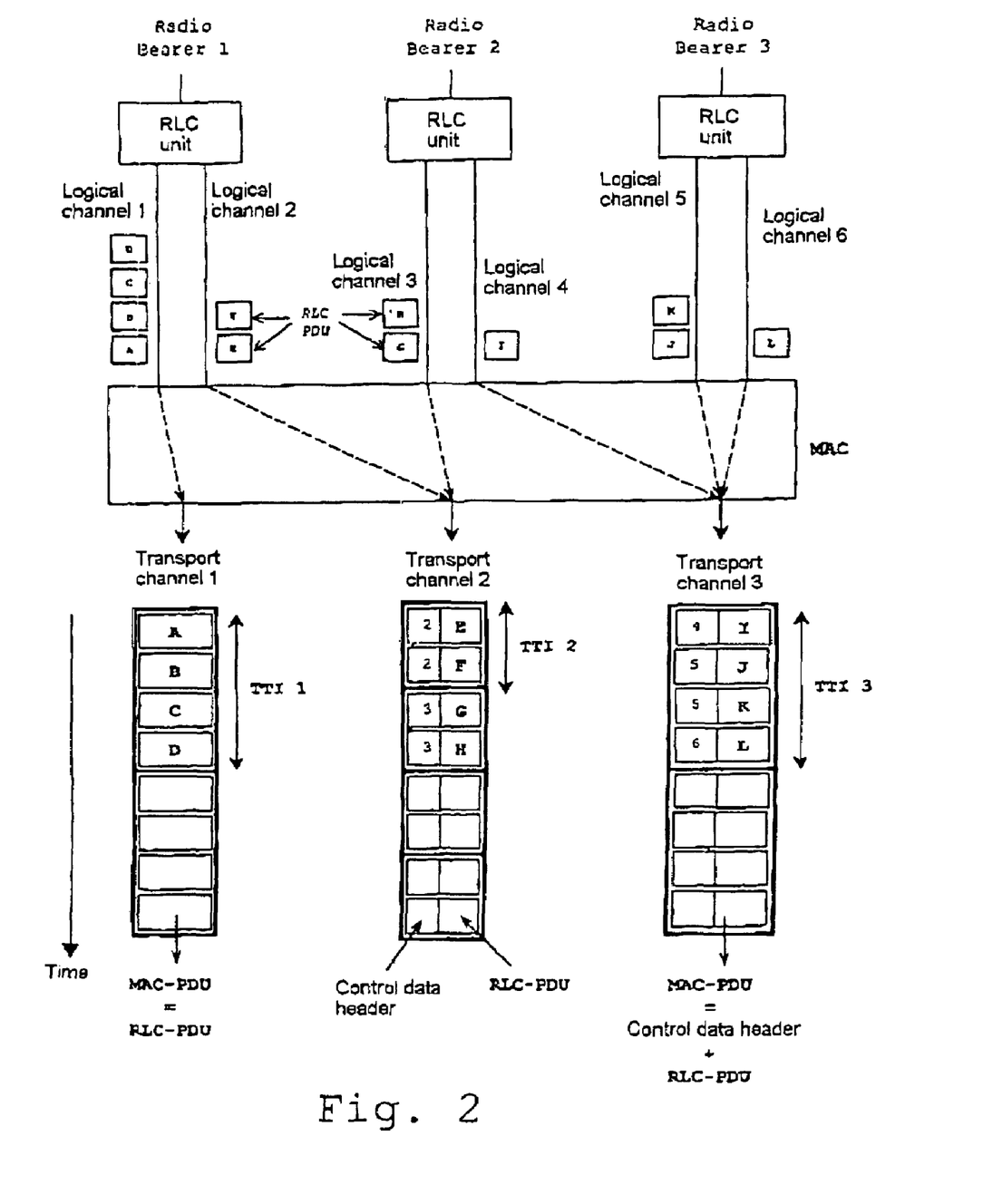
FIG. 2 shows the known multiplexing of logical channels onto transport channels.

The MAC maps the RLC-PDUs received from the RLC units onto the transport channels, as is illustrated schematically in FIG. 2. In FIG. 2, all the RBs are transported bidirectionally, and the user data as well as RLC control data are transported via different logical channels. However, for the sake of simplicity, FIG. 2 shows only the logical channels for one transmission direction.

The MAC can transmit the data for one logical channel (the transport channel 1 in FIG. 2), or else the data for a number of logical channels, to the layer 1 via one transport channel. If the data from a number of logical channels is transmitted via one transport channel, interleaved in serial form in time, there are two possible ways in which the MAC can achieve this. The MAC can either transmit only the data for one logical channel (the transport channel 2 in FIG. 2) within one TTI, or can even transmit the data for a number of logical channels (the transport channel 3 in FIG. 2) within one TTI. If the data from a number of logical channels are transmitted within one TTI, the RLC Size of the logical channels must be the same (that is to say, the data units I, J, K, L in FIG. 2 must be of equal size), although this is not absolutely essential when logical channels are transmitted in different TTIs (thus, in FIG. 2, F and E on the one hand and H and G on the other hand may be of different size). The MAC then demands a specific number of RLC-PDUs from each RLC unit so that, overall, the "Number of Transport Blocks" is reached for the TF of the respective transport channel. The data from a number of logical channels thus can be transmitted via one transport channel within one TTI. In general, the MAC signals to the RLC units, taking account of the priorities of the individual logical channels and their transmission memory occupancy, how many RLC-PDUs are expected for each TTI. For each TTI, the MAC determines the static and dynamic parameters required for transmission for each transport channel by choosing one TFC from the TFCS, via which the TF is defined for each transport channel.

Figure 3:
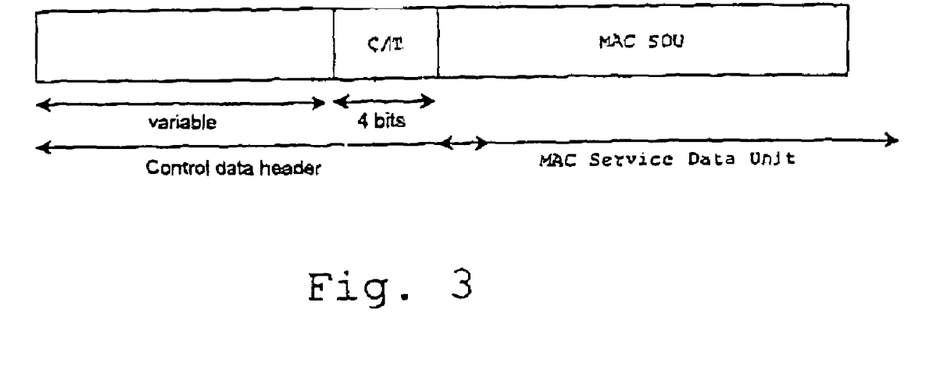
FIG. 3 shows a known MAC-PDU with a control data field.

At the receiver end, the received MAC-PDUs can be distributed between the logical channels without any problems, provided only the data for one logical channel is transmitted via one transport channel. In this case, the allocation of MAC-PDUs to logical channels is unambiguous for the MAC, and one MAC-PDU corresponds precisely to one RLC-PDU. In order to ensure the distribution of the MAC-PDUs when a number of logical channels are transmitted via one transport channel, irrespective of whether only the data from one logical channel or the data from a number of logical channels is transmitted in each TTI, the RLC-PDUs are prefixed in the transmitter by an addition to the control data (the control data header in FIG. 3), see TS 25.321, Medium Access Control, 3GPP, September 2000, pages 23-27. Among other items, this header contains a so-called C/T field, in which the identification number of the corresponding logical channel from which the RLC-PDU originates is transmitted. During this demultiplexing process, the identification number allows the receiver to associate the received MAC-PDUs unambiguously with the logical channels. Since the C/T field has a length of 4 bits and the bit combination "1111" is a reserved value, a maximum of 15 logical channels can be mapped onto one transport channel.

One object of the present invention is to provide optimized data transmission between a number of logical channels and one transport channel. In general, the aim is to provide optimized data transmission between a number of second channels and one first channel, to be precise both in one direction and in the other (multiplexing, demultiplexing).

For the method of the type mentioned initially, this object is achieved in that, in the configuration, at least one size of data units is in each case supported by only a single second channel, in order to allow data units of this size to be allocated to the relevant second channel.

Furthermore, in the case of transmission and/or receiving apparatuses of the type mentioned initially, the object is achieved in that the transmission and/or receiving apparatus has a processor which is set up such that it can carry out the method steps according to the present invention.

Furthermore, this object is achieved by computer programs and by a computer program product which implement the method.

When the following text refers to data units in the plural form, it is self-evident that this also includes passing on an individual data unit as well as a data unit of size 0 via a second channel in the sense of the present invention.

A particular advantage of the present invention is that, with appropriate configuration, each second channel, in particular each logical channel, can be identified just by the size of its data packets. In the specific case under consideration, this saves the receiver having to read the identification number of a logical channel from a C/T field, such that it can distribute the MAC-PDUs more efficiently between the appropriate logical channels.

Thus, according to the present invention, the data units transmitted between the channels are allocated to individual second channels on the basis of the size of the data units.

In the case of data transmission using UMTS via an air interface, there is thus no need for the C/T field in the control data header of an MAC-PDU for transmitting a number of logical channels via one transport channel, the so-called multiplexing, provided only one logical channel is transmitted in predetermined TTIs. Here, the term "predetermined" refer to, for example, data units of in each case one logical channel being transmitted without a C/T field in each of, in each case, nine successive TTIs, and data units even of different logical channels, for example, being transmitted with a C/T field in every tenth TTI. However, the most efficient approach is to pass on only data units from a single second channel in each TTI in the first channel, provided the sizes of the data units, which are to be transmitted via the first channel, of different second channels differ from one another.

Thus, during transmission, a number of logical channels are mapped onto one transport channel and, during reception, one transport channel is distributed between a number of logical channels (demultiplexing), without needing to expressly identify the RLC-PDUs of the individual logical channels.

One particular advantage of the present invention is that it is possible to save 4 bits of control data per transmitted MAC-PDU in one logical channel. This generally saves transmission capacity and, in the ideal case when user data is transmitted instead of control data, leads to an increase in the user data rate.

Additional features and advantages of the present invention are described in, and will be apparent from, the following Detailed Description of the Invention and the Figures.

BRIEF DESCRIPTION OF THE INVENTION

DETAILED DESCRIPTION OF THE INVENTION

Figure 4:
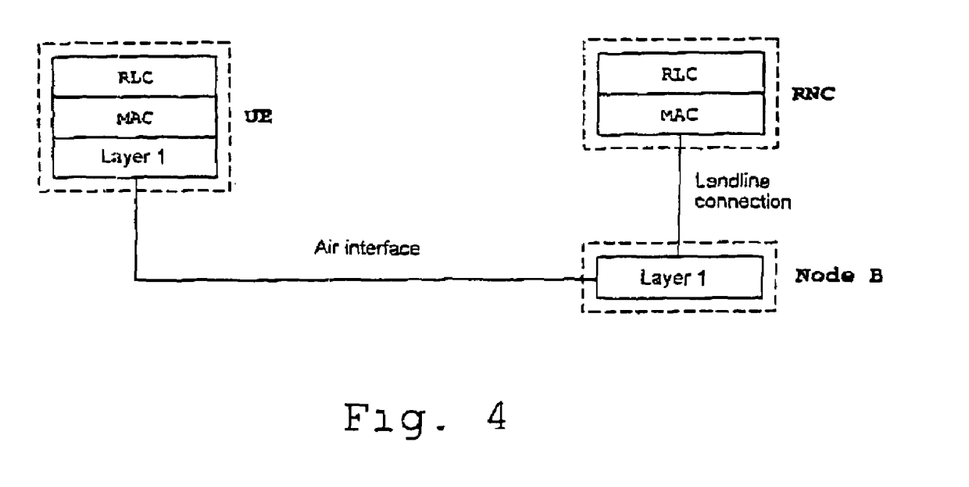
FIG. 4 shows a known UMTS connection.
Figure 5:
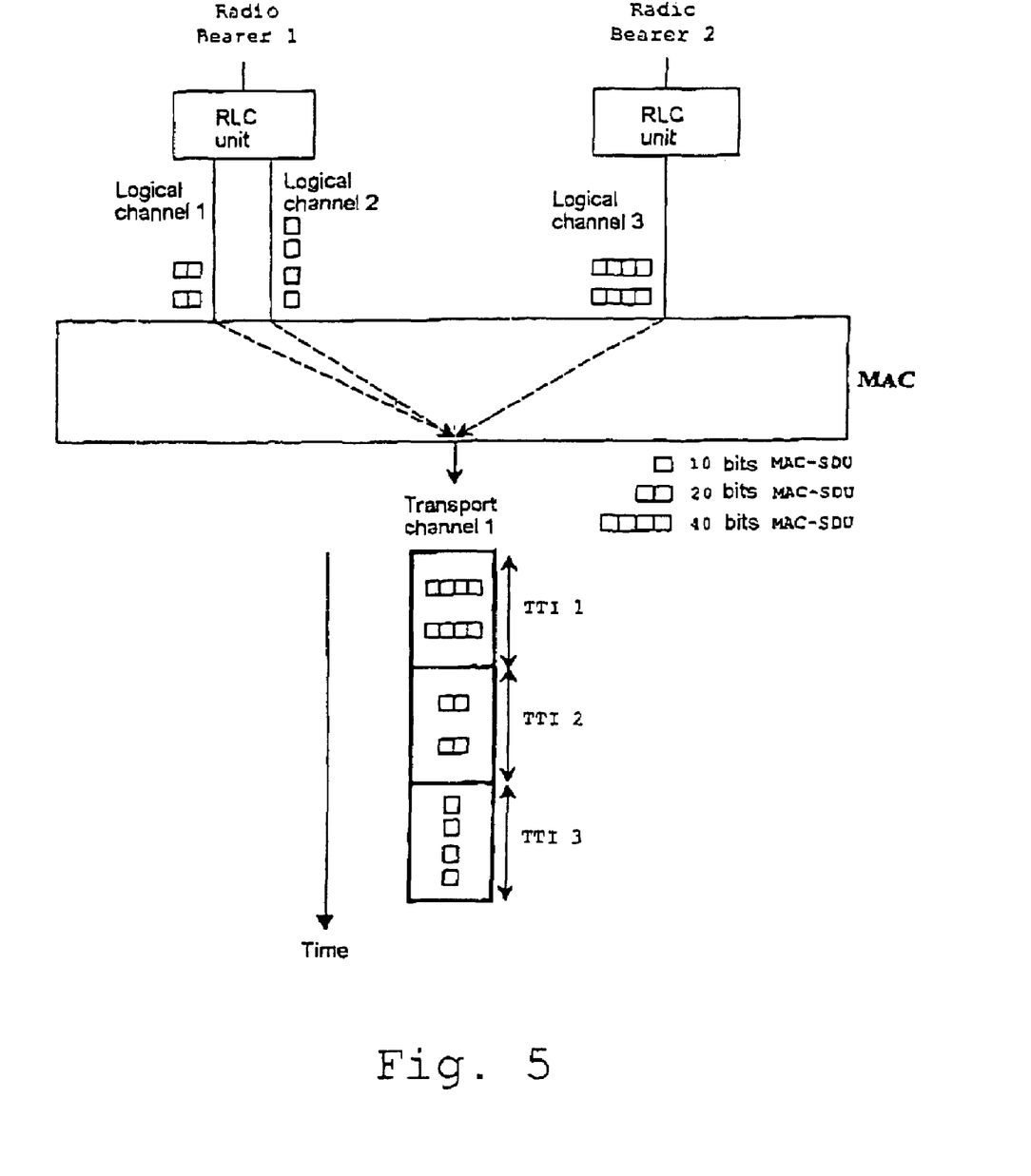
FIG. 5 shows the multiplexing of logical channels for different RLC Sizes.

The exemplary embodiments are based on a UMTS connection as shown in FIG. 4. In this case, the RRC configures two RBs for the connection, with the first RB being intended to operate bidirectionally, and the second RB unidirectionally. An RLC unit is provided for each RB in the RLC. The user data and the RLC control data are transported via different logical channels in the RLC unit of the Radio Bearer 1. The first RLC unit thus has a total of four logical channels (two each per transmission direction), and the second RLC unit has only one logical channel. Since, for the sake of clarity and simplicity, only one transmission direction is ever considered in the exemplary embodiments, FIG. 5 shows only three logical channels, which are mapped onto the transport channel 1. Furthermore, by way of example, one TFS has been transferred to the MAC during the process of configuring the transport channel 1, as is illustrated in Table 1.

To allow the C/T field to be omitted when a number of logical channels are being transmitted via one transport channel in the sense of the present invention, a further precondition is that only MAC-SDUs of one logical channel are ever transmitted during one TTI (the transport channel 2 in FIG. 2).

Once the configuration phase has been completed, that is to say all the layers with their units (for example, RLC, MAC, etc.) have been set appropriately for the connection, the MAC chooses the best TF from the TFS for the transport channel 1 for each TTI, taking account of the RLC Sizes which a specific logical channel supports. During the configuration process in this exemplary embodiment, the 10-bit RLC Size should be allocated only to the logical channel 2, the 20-bit RLC Size should be allocated only to the logical channel 1, and the 40-bit RLC Size should be allocated only to the logical channel 3. As such, each logical channel supports only one RLC Size.

Furthermore, by way of example, it is assumed that the logical channel 3 has the highest priority, and that the logical channel 2 has the lowest priority. Thus, for the TTI 1 in which, on the basis of its priority, the logical channel 3 is transmitted, the MAC selects the TF with the TFI 8, see Table 1. The MAC then signals an RLC Size of 40 bits to the RLC unit for the logical channel 3, and demands two RLC-PDUs from that unit. The RLC unit then immediately starts to break down or assemble the RLC-SDUs supplied from higher layers to the RLC Size, and then passes the RLC-PDUs which are produced in this way and whose size is 40 bits via the logical channel 3 to the MAC. The MAC transmits the RLC-PDUs within the first TTI, without needing to prefix them by a control data header, via the transport channel 1 to the layer 1. In the TTI 2, the MAC selects the TF with the TFI 4 for the transport channel 1. In the TTI 3, in which the logical channel 2 with the lowest priority is transmitted, it selects the TF with the TFI 3. Thus, in the second TTI, the MAC receives two RLC-PDUs with lengths of 20 bits which, in precisely the same way as the four RLC-PDUs of lengths of 10 bits in the third TTI, it transfers to the layer 1 via the transport channel without any additional control data header. In this case, the layer 1 in each case ensures that the MAC-PDUs are transmitted via the air interface.

Since only RLC-PDUs of one logical channel are ever transmitted in each TTI and, in this exemplary embodiment, all the logical channels pass on RLC-PDUs of different lengths and wait for RLC-PDUs of different lengths in the receiver, by virtue of their configuration, the MAC unit in the receiver can unambiguously allocate all the incoming MAC-PDUs to the corresponding logical channels on the basis of their RLC Size. There is thus no need for the RLC-PDUs in the transmitter to be preceded by a 4-bit long identification number for the associated logical channel in a control data header.

In contrast, in the prior art, in the situation where a number of logical channels are transmitted via one transport channel, the RLC-PDUs are always preceded by an identification number in a MAC header. Thus, with respect to this exemplary embodiment, a total of 32 bits (8*4 bits) of control data were saved just in the three illustrated TTIs for eight transmitted RLC-PDUs (two in the TTI 1, two in the TTI 2, and four in the TTI 3). If one now considers the lack of the identification number and of the C/T field just in the configuration of the RLC Sizes of the TF of the transport channel, that is to say all the RLC Sizes are increased in the same way by 4 bits, 4 bits more user data are transmitted in each RLC-PDU. As such, the user data rate can be increased effectively via the present invention.

In the first exemplary embodiment, only different RLC Sizes were allocated to the logical channels. Although this allows a particularly increased data rate to be achieved, the present invention can, however, also be used advantageously for RLC Sizes which are in some cases the same. If, based on the first exemplary embodiment, it is assumed for a second exemplary embodiment that the 20-bit RLC Size has been allocated to the logical channel 2, rather than the 10-bit RLC Size during the connection configuration process, so that the MAC cannot select the TF with the TFI 3 for the third TTI because the logical channel 2 does not support the 10-bit RLC Size, the MAC selects the TF with the TFI 2 for the TTI 3 in this second exemplary embodiment, see FIG. 6. All the other assumptions are the same as those for the first exemplary embodiment.

Figure 6:
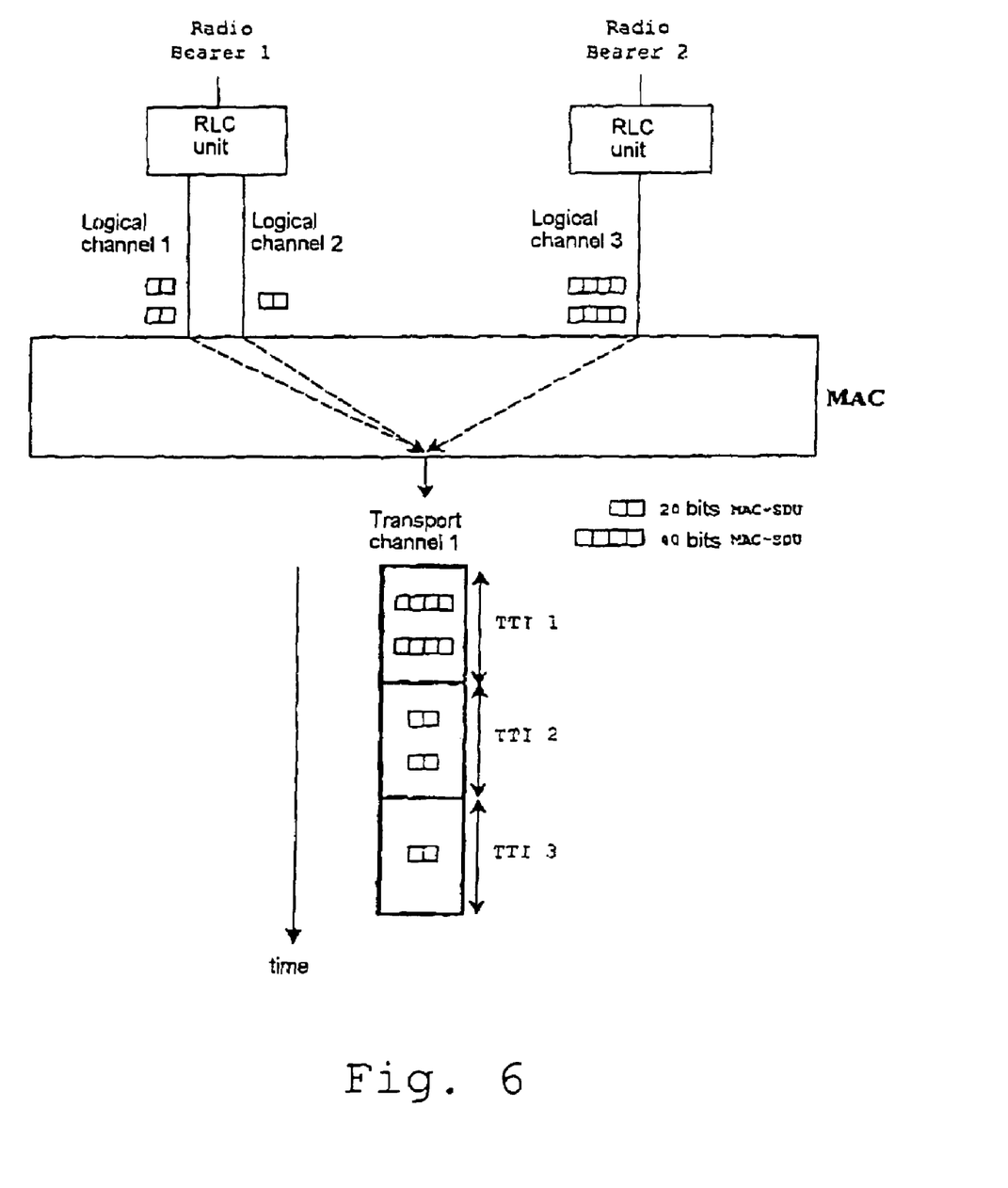
FIG. 6 shows the multiplexing of logical channels when the RLC Sizes are in some cases the same.

Since the logical channels 1 and 2 are allocated the same RLC Size, the RLC-PDUs from these logical channels must be preceded by the appropriate identification number for the logical channels in the C/T field of the MAC header for the duration of this connection. However, the RLC-PDUs for the logical channel 3 still do not need to be preceded by any identification number. This is because the receiver can allocate the RLC-PDUs for the logical channels 1 and 2 to the correct logical channels on the basis of the identification number, and the RLC-PDUs for the logical channel 3 can still be identified unambiguously by the receiver on the basis of the RLC Size, which is allocated only to this logical channel. Thus, in comparison to the prior art, 8 bits (2*4 bits) of control data are saved in this case as well for a total of five transmitted RLC-PDUs (two in the TTI 1, two in the TTI 2 and one in the TTI 3), with two RLC-PDUs being transmitted without any identification number. If user data is now once again transmitted instead of the control data that is not required, the user data rate can also once again be increased in a corresponding manner.

In general, subject to the condition that only RLC-PDUs for one logical channel are ever transmitted during one TTI, the present invention can be used as soon as one logical channel produces RLC-PDUs of one RLC Size, which has been allocated only to this one logical channel during the configuration process, thus once again also allowing a corresponding increase in the user data rate.

The present invention can be applied in a general way in the case of distribution of data channels which are identified by the nature of the data to be transmitted via them (for example, logical channels), to those data channels which are characterized by the way in which the data is transmitted via the air interface of a mobile radio system; in particular, UMTS (for example, transport channels), or vice versa. In this case, in particular, the data can be transmitted from a mobile station (UE) to a node in the mobile radio system, in particular a radio network controller (RNC), or vice versa.

For the purposes of the present invention, the expression transmission and/or receiving refers to means, in particular, a mobile telecommunications terminal as well as a mobile communications network, in which the method according to the present invention is used.

Although the present invention has been described with reference to specific embodiments, those of skill in the art will recognize that changes may be made thereto without departing from the spirit and scope of the invention as set forth in the hereafter appended claims.

TABLE 1

Transport Format Set (TFS)

| | | Static Parameters | | Dynamic Parameters | |
|---|---|---|---|---|---|
| TFI | TTI | Coding Scheme | CRC length | RLC Size | No. of Transport Blocks |
| 1 | 10 ms | No channel coding | 0 bits | 10 bits | 2 |
| 2 | " | No channel coding | " | 20 bits | 1 |
| 3 | " | No channel coding | " | 10 bits | 4 |
| 4 | " | No channel coding | " | 20 bits | 2 |
| 5 | " | No channel coding | " | 40 bits | 1 |
| 6 | " | No channel coding | " | 10 bits | 8 |
| 7 | " | No channel coding | " | 20 bits | 4 |
| 8 | " | No channel coding | " | 40 bits | 2 |
| 9 | " | No channel coding | " | 80 bits | 1 |

The invention claimed is:

1. A method for multiplexing a plurality of logical channels onto a transport channel, in accordance with a UMTS protocol architecture for air interface in a transmission apparatus, the method comprising the steps of:

processing the logical channels using at least one configuration command, wherein the processing determines sizes of data units to be transported by the logical channels;

configuring each logical channel, after processing, to contain a unique data size for multiplexing onto the transport channel, wherein a radio resource control layer negotiates the configuration of each logical channel and at least one logical channel is identifiable according to the unique data size of the at least one logical channel; and supporting, in each configured logical channel, further data units that are the same size as the unique size configured to each logical channel.

2. A method for multiplexing a plurality of logical channels onto a transport channel as claimed in claim 1, the method further comprising the steps of:

producing RLC-PDUs, whose data unit sizes are at least partially different from remaining data units, by at least one upper layer RLC unit;

passing on the produced RLC-PDUs, on the plurality of logical channels, to at least one MAC lower layer unit, and passing on only data units of the same size on one logical channel in the configuration; and passing on the data units from the at least one MAC lower layer unit to the transport channel in transmission time intervals which are predetermined by the configuration;

wherein only data units from a single logical channel are passed on in the configuration in each predetermined transmission time interval in the transport channel, and data units are allocated to at least one logical channel based on the size of the data units, with the size not being supported by any other logical channel in the configuration.

3. A method for multiplexing a plurality of logical channels onto a transport channel as claimed in claim 1, the method further comprising the step of:

passing on data units, whose sizes are at least partially different from remaining data units, from the transport channel to the plurality of logical channels, with the data units being passed via the transport channel in transmission time intervals, which are predetermined by the configuration;

wherein only data units from a single logical channel are passed on in the configuration in each predetermined transmission time interval in the transport channel, and data units are allocated to at least one logical channel based on the size of the data units, with the size not being supported by any other logical channel in the configuration.

4. An apparatus for at least one of transmitting and receiving messages based on a UMTS protocol architecture of an air interface, the apparatus comprising:

a unit for receiving a plurality of logical channels; and a processing unit that processes the logical channels using at least one configuration command, wherein the processing determines sizes of data units to be transported by the logical channel, and wherein the processing unit configures each logical channel to contain a unique data size for multiplexing onto a transport channel, and wherein a radio resource control layer negotiates the configuration of each logical channel and at least one logical channel is identifiable according to the unique data size of the at least one logical channel, and wherein each configured logical channel supports further data units that are the same size as the unique size configured to each logical channel.

5. An apparatus for at least one of transmitting and receiving messages as claimed in claim 4, wherein the apparatus is a mobile telecommunications terminal.

6. An apparatus for at least one of transmitting and receiving messages as claimed in claim 4, wherein the apparatus is a mobile communications network.

7. A method for demultiplexing a plurality of logical channels onto a transport channel, in accordance with a UMTS protocol architecture for air interface in a transmission apparatus, the method comprising the steps of:

processing the logical channels using at least one configuration command, wherein the processing determines sizes of data units to be transported by the logical channels;

configuring each logical channel, after processing, to contain a unique data size for demultiplexing from the transport channel, wherein a radio resource control layer negotiates the configuration of each logical channel and at least one logical channel is identifiable according to the unique data size of the at least one logical channel; and supporting, in each configured logical channel, further data units that are the same size as the unique size configured to each logical channel.

8. An apparatus for at least one of transmitting and receiving messages based on a UMTS protocol architecture of an air interface, the apparatus comprising:

a unit for receiving a plurality of logical channels; and a processing unit that processes the logical channels using at least one configuration command, wherein the processing determines sizes of data units to be transported by the logical channel, and wherein the processing unit configures each logical channel to contain a unique data size for demultiplexing from a transport channel, and wherein a radio resource control layer negotiates the configuration of each logical channel and at least one logical channel is identifiable according to the unique data size of the at least one logical channel, and wherein each configured logical channel supports further data units that are the same size as the unique size configured to each logical channel.

* * * * *